United States Patent [19]
Kasugai et al.

[11] 3,891,756
[45] June 24, 1975

[54] AGRICULTURAL PESTICIDE COMPOSITION

[75] Inventors: Hiroshi Kasugai, Tokyo; Shozo Motojima, Kawasaki; Kazuhiko Inoue, Machida, all of Japan

[73] Assignee: Mitsubishi Chemical Industries Ltd., Tokyo, Japan

[22] Filed: Dec. 26, 1973

[21] Appl. No.: 428,619

[30] Foreign Application Priority Data
May 21, 1973 Japan.................. 48-56603

[52] U.S. Cl................. 424/177; 424/180
[51] Int. Cl.$^2$...................... A61K 27/00
[58] Field of Search............... 424/177, 180

[56] References Cited
OTHER PUBLICATIONS
"Chem. Abstracts," Vol. 66, (1967), pg. 5882, pars. 62,722h, – Abstract of German Patent to Kohlhepp.
"Chem. Abstracts," Vol. 76, (1972), page 171, pars. 32,314(R), – Abstract of German Publication to Borthwick et al.

*Primary Examiner*—Elbert L. Roberts
*Attorney, Agent, or Firm*—Bierman & Bierman

[57] ABSTRACT

This invention relates to an improved composition containing biopolymer such as alginic acid, casein, etc., which has prevention effects on plant diseases, whose improvement comprises increasing the solubility of biopolymer.

The improved composition consists of biopolymer having prevention effects on plant diseases, organic acid, carbonate and silica or silica-containing material such as talc, clay, kaolin bentonite etc.

13 Claims, No Drawings

AGRICULTURAL PESTICIDE COMPOSITION

BACKGROUND OF THE DISCLOSURE

Various macro-molecule materials obtained from a living body such as alginic acid, casein, globulin etc. are reported to have a prevention effect on plant-diseases such as virus-infection etc. Therefore, it has been studied to use these biopolymers as agricultural chemicals.

For example, there has been reported in "The inhibition of Tobacco Mosaic Virus by proteins from bovine milk and blood serum" Lucas C. B. and W. W. Hare, Phytopathology Vol. 49; "Control of TMV with Milk" ibid.; and "Prevention effect of medicine made of alginic acid for TMV disease" Keiichi Tomaru, Collected Summaries of Lectures at General Meeting of 1973 of The Phytopathological Society of Japan.

Since a biopolymer, compared with conventional agricultural chemicals, has less toxicity for humans and animals, it is desirable to use it as a novel agricultural chemical.

However, a biopolymer is generally difficult to dissolve in water homogeneously. Therefore, in order to apply it as an agricultural chemical, it is necessary to be heated or to be stirred until it completely dissolves in water, which takes a long time. Thus a homogeneous solution cannot be obtained, which sometimes causes an insufficient effect or an injury on plants and further clogs sprinklers. So it is unefficient and has not been of practical use.

We have found that when a biopolymer is mixed with carbonate and organic acid, it is possible to make the biopolymer easily soluble in water. Continued study enabled us to put it to practical use as an agricultural chemical.

SUMMARY OF THE INVENTION

The object of this invention is to provide a new pesticide composition for agriculture which is able to prevent plant diseases effectively and which has less toxicity to humans and animals. More precisely, it relates to a pesticide composition for agriculture whose active ingredient is a biopolymer having prevention effects on plant-diseases and can be practically used.

The composition of the present invention is obtained by mixing a biopolymer having prevention effects on plant-diseases with, carbonate, organic acid and silica or a silica-containing material.

DETAILED DESCRIPTION OF THE INVENTION

As a biopolymer which is one of the components of the present composition, for example, various kinds of biopolymer having prevention effects of plant-diseases are employed. Suitable biopolymers include alginic acid, carrageenan, casein, β-globulin, α-globulin, lactglobulin, albumin, gluten, pectin, starch, gelatin, and the water-soluble salts thereof such as alkali metal salts. The carbonates include calcium carbonate, sodium bicarbonate, sodium carbonate, potassium bicarbonate, potassium carbonate, ammonium carbonate, and the like.

The organic acids applied to the present composition are acids which react with carbonate to generate carbon dioxide gas, for example, tartaric acid, citric acid, succinic acid, fumaric acid, lactic acid, malic acid, maleic acid, phthalic acid, acetic acid and lauric acid, etc. The silica or silica-containing material, which is the other component of the present composition include silica, clay mineral such as talc, clay, kaolin, bentonite etc. and diatomaceous earth, white carbon and the like. Materials having a high percentage of $SiO_2$, such as diatomaceous earth and white carbon are particularly preferred.

The carbonate reacts with the organic acid in water generating carbon dioxide gas, which helps the dissolution of biopolymer. Silica or silica-containing material is hydrated in water to form OH groups which causes its strong affinity with water. So it is presumed that the biopolymer and silica or silica-containing material bind weakly in the water to heighten the affinity of the biopolymer for water, forming extremely homogeneous colloidal solutions not showing any coagulation, and then promptly dissolves in water.

Furthermore, silica or silica-containing material gives an anti-caking effect for the composition.

It is desired to add a surface active agent to the composition of the present invention, because a composition with more solubility can be obtained and further it makes the spreading effect increase when it is sprayed on plants.

The surface active agent may be selected from a wide range of general nonionic or anionic types. However, it is preferable that it has affinity against a biopolymer and at the same time has excellent wetting and dispersive ability and low toxicity.

Suitable nonionic surface active agents include polyoxyethylene sorbitan monolaurate, polyoxyethylene sorbitan monooleate, polyoxyethylene sorbitan dioleate, polyoxyethylene sorbitan monostearate, polyoxyethylene glycerine borate laurate, polyoxyethylene glycerine borate stearate, hexaoxyethylene nonyl phenol sodium phosphate, tetraoxyethylene lauryl potassium phosphate, heptaoxyethylene oleil sodium phosphate, and suitable anionic type surface active agents include higher alcohol sulfates and the like.

The composition of the present invention is obtained by mixing the above mentioned components. Respective components are not necessarily of one kind, and two or more of the biopolymers carbonates, organic acids, silica-containing material and/or surface active agents may be used.

The mixing ratio of the sum of carbonate and organic acid is 10–50 percent by weight, preferably 15–30 percent by weight, based on the biopolymer.

The amount of the organic acid is as same equivalent as that of the carbonate and preferably said acid is used in somewhat excess amount.

The amount of surface active agent to be used is 0.5–8 percent by weight, preferably 1–5 percent by weight, based on the biopolymer.

The amount of silica-containing material to be used is preferably 1–10 percent by weight based on the biopolymer, calculated as $SiO_2$.

As the composition of the present invention contains biopolymer, it may be degenerated by mold, bacteria, etc. Therefore, anti-mold agents such as benzoic acid may be added when it is necessary.

The composition of the present invention is produced by mixing biopolymer, carbonate, organic acid, silica-containing material and, if necessary, additives such as a surface active agent and anti-mold agents and then, preferrably, grinding the mixture. In order to highten the effect of the present composition, namely to get a better solubility and the prevention effect of plant-disease, the obtained composition is desirably ground to a particle size in the range of 40–250 mesh (This was measured according to Japanese Industrial Standard.), preferably 100–200 mesh.

In this case, at least biopolymers which have the direct relation with said effects are particularly desired to have such a particle size as mentioned above.

The method of using the present composition is not especially limited, so that known methods with these kinds of agricultural chemicals may be employed.

For example, the method of controlling the TMV-disease of tobacco, by using the composition of the Example 1, is as follows. The composition is diluted in 100–400 times with water which is sprayed on all around the tobacco seedlings at the ratio 30 l per 10 ares before the transplanting. Accompanying the growing of the plants the composition is administered, just before the times of first mulching, of last mulching and of bud cutting, in an amount in the range of 30–180 l for each time depending upon the size of the plants.

The following Examples and tests further illustrate the embodiment of the present invention but do not limit the invention.

In the following Examples, the term "parts" means "parts by weight."

EXAMPLE 1

63 parts of sodium alginate, 16 parts of sodium caseinate, 8 parts of sodium bicarbonate, 7 parts of tartaric acid and 4 parts of diatomaceous earth (manufactured by Kurida Yakuhin Kogyo Co., Ltd., $SiO_2$ content; 86.6 percent) are mixed previously and then, 2 parts of Sorbon T-80 (manufactured by Toho Chemical Industrial Co., Ltd. poly oxyethylene sorbitan monooleate type surface active agent) is added, which is ground by a pulverizer (manufactured by Hosokawa Iron Works Ltd.; Pulverizer APB) to obtain the composition having the particle size of 100–200 mesh.

EXAMPLE 2

60 parts of sodium alginate, 19 parts of sodium caseinate, 8 parts of sodium carbonate and 9 parts of citric acid are mixed. Separately, 3 parts of white carbon "Siruton A" (manufactured by Mizusawa Industrial Chemicals Limited $SiO_2$ contents; 94.5 percent) and 1 part of Sorbon T-80 are mixed. And then, the above two kinds of mixtures are put together and is ground by the above mentioned pulverizer to obtain the composition having the particle size of 100–200 mesh.

EXAMPLE 3

60 parts of alpha-globulin, 20 parts of sodium caseinate, 8 parts of potassium bicarbonate, 7 parts of succinic acid and 4 parts of talc "SW" (manufactured by Nihon Talc Co., Ltd., $SiO_2$ content; 62.6 percent) are previously mixed, and further 1 part of Sorbon T-80 is added and then is ground by said pulverizer to obtain the composition having the particle size of 100–200 mesh.

The prevention effects of the composition of present invention and of the reference composition (particle size; 100–200 mesh) shown in the Table 1 hereunder are tested. Figures in the following Tables means weight parts.

Table 1

| Component | No. 1 | 2 | 3 | 4 | 5 | 6 | 7 | 8 | 9 | 10 | 11 | 12 | 13 | 14 | 15 | Ref. 1 | Ref. 2 | Ref. 3 |
|---|---|---|---|---|---|---|---|---|---|---|---|---|---|---|---|---|---|---|
| Sodium alginate | 63 | 60 |    | 63 | 63 | 63 | 63 | 63 | 63 | 61 | 63 | 63 | 63 | 63 | 63 | 63 | 63 | 63 |
| Sodium caseinate | 16 | 19 | 20 | 16 | 16 | 16 | 16 | 16 | 16 | 14 | 16 | 16 | 16 | 16 | 16 | 16 | 16 | 16 |
| χ-guloblin |   |   | 60 |   |   |   |   |   |   |   |   |   |   |   |   |   |   |   |
| Diatomaceous earth[1] | 4 |   |   |   |   |   |   | 2 | 6 | 10 |   |   | 4 |   | 4 |   |   | 21 |
| White carbon[2] |   | 3 |   | 4 |   |   |   |   |   |   | 4 | 4 |   | 4 |   |   |   |   |
| Talc[3] |   |   | 4 |   | 4 |   |   |   |   |   |   |   |   |   |   |   |   |   |
| Clay[4] |   |   |   |   |   | 4 |   |   |   |   |   |   |   |   |   |   |   |   |
| Bentonite[5] |   |   |   |   |   |   | 4 |   |   |   |   |   |   |   |   |   |   |   |
| Sodium bicarbonate | 8 |   |   | 8 | 8 | 8 | 8 |   |   |   |   |   | 8.5 | 8 | 8 | 10 | 10 |   |
| Sodium carbonate |   | 8 |   |   |   |   |   | 9 | 7 | 7 | 9 | 7 |   |   |   |   |   |   |
| Potassium bicarbonate |   |   | 8 |   |   |   |   |   |   |   |   |   |   |   |   |   |   |   |
| Succinic acid |   |   | 7 |   |   |   |   | 8 | 6 | 6 | 7.5 | 6 | 7.5 |   |   |   |   |   |
| Tartaric acid | 7 |   |   | 7 | 7 | 7 | 7 |   |   |   |   |   |   |   |   | 9 | 11 |   |
| Citric acid |   | 9 |   |   |   |   |   |   |   |   |   |   |   |   |   |   |   |   |
| dl-malic acid |   |   |   |   |   |   |   |   |   |   |   |   |   | 7 |   |   |   |   |
| Fumaric acid |   |   |   |   |   |   |   |   |   |   |   |   |   |   | 7 |   |   |   |
| Sorbon T-80 | 2 | 1 | 1 | 2 | 2 | 2 | 2 | 2 | 2 | 2 | 0.5 | 4 | 1 | 2 | 2 | 7 | 2 | 2 |

[1]manufactured by Kurida Yakuhin Kogyo Co., Ltd.
  $SiO_2$ content; 86.6%
[2]manufactured by Mizusawa Industrial Chemicals Ltd.
  Siruton A
  $SiO_2$ content; 94.5%
[3]manufactured by Nihon Talc Co., Limited
  SW
  $SiO_2$ content; 62.6%
[4]manufactured by Kunimine Koka Kogyo Company
  $SiO_2$ content; 60.0%
[5]manufactured by Kunimine Koka Kogyo Company
  $SiO_2$ content; 67.0%

TEST 1

A potted tobacco seedling "Nicotiana glutinosa" is sprayed by a spray-gun with a solutions of the test composition and dried in the air. Purified Tobacco mosaic virus (abbreviate as T.M.V.) solution is inoculated on the seedling according to the ordinal carborundum method and placed in a greenhouse for about 1 week to form the local lesion. The number of the formed local lesion is examined and compared with that of untreated zone. The results of these tests as a protection percentage are shown in Table 2. A solution of test composition used is prepared by dissolving one part of the test composition (whose numbers correspond to those of Table 1) in 99 parts of water and standing it for 10 minutes to form 100 times dilution, and likewise solutions of 200 times dilution, 400 times dilution are prepared.

The purified TMV solution employed in this test is prepared by separating TMV by a ultracentrifuge from the juice of TMV infected leaves.

In addition, the injury of the chemical is tested at the time where the solution of 100 times dilution is applied to tobacco seedling of "Bright Yellow" and the result is shown in Table 2.

Table 2

| Test composition | No. | Protection Value for TMV-disease spots (%) Concentration | | | Injury on Tobacco Plant |
|---|---|---|---|---|---|
| | | 100 times dilution | 200 times dilution | 400 times dilution | (Bright) (Yellow) |
| Present Composition | 1 | 100 | 98 | 98 | none |
| | 2 | 98 | 96 | 96 | none |
| | 3 | 95 | 93 | 90 | " |
| | 4 | 99 | 98 | 98 | " |
| | 5 | 96 | 93 | 91 | " |
| | 6 | 95 | 92 | 92 | " |
| | 7 | 96 | 90 | 89 | " |
| | 8 | 97 | 95 | 92 | " |
| | 9 | 98 | 94 | 94 | " |
| | 10 | 96 | 92 | 90 | " |
| | 11 | 94 | 90 | 89 | " |
| | 12 | 97 | 95 | 94 | " |
| | 13 | 99 | 98 | 98 | " |
| | 14 | 98 | 96 | 92 | " |
| | 15 | 99 | 97 | 90 | " |
| Reference Composition | 1 | 96 | 81 | 81 | " |
| | 2 | 89 | 80 | 79 | " |
| | 3 | 80 | 72 | 53 | " |
| Untreated zone | | 0 | | | " |

TEST 2

According to the same method in Test 1, employing *Vigna sinensis* var. *sesquipendalis*, cv. Kurodanesanjaku as a plant to be tested, the effect of the composition of the present invention against Cucumber Mosaic Virus (CMV) is examined. The test solutions are 100-times dilution, 200-times dilution, 400-times dilution respectively, all of which is used 10 minutes after the dilution by water.

The results are illustrated in Table 3.

Table 3

| Test composition | No. | Protection value for CMV. disease spot (%) Concentration | | |
|---|---|---|---|---|
| | | 100 times dilution | 200 times dilution | 400 times dilution |
| Present Composition | 1 | 100 | 100 | 98 |
| | 2 | 98 | 98 | 94 |
| | 3 | 98 | 97 | 95 |
| | 4 | 100 | 98 | 96 |
| | 5 | 99 | 96 | 92 |
| | 6 | 98 | 95 | 91 |
| | 7 | 99 | 96 | 90 |
| | 8 | 97 | 95 | 94 |
| | 9 | 95 | 92 | 90 |
| | 10 | 96 | 95 | 89 |
| | 11 | 95 | 92 | 87 |
| | 12 | 96 | 95 | 90 |
| | 13 | 100 | 100 | 95 |
| | 14 | 100 | 96 | 93 |
| | 15 | 98 | 94 | 93 |
| Reference Composition | 1 | 88 | 88 | 80 |
| | 2 | 87 | 85 | 70 |
| | 3 | 85 | 83 | 76 |
| Untreated Zone | | 0 | | |

TEST 3

The test is carried on the potted tabacco seedlings (*Nicotiana tobacum* var. Bright Yellow and *Nicotiana tobacum* var. *Xanthi*). The composition is diluted with water in the same manner as the Test 1 to prepare 200-times dilution and left for 10 minutes and then, sprayed by a spray-gun all around said tobacco plants. After the plant is dried, the purified T.M.V. solution whose concentration is 2 m$\mu$g/ml is inoculated on 5 × 5 cm/surface of the largest leaf of the seedling.

The assesment is carried by counting the number of seedlings showing mosaic symptoms (Systemic symptoms) which were considered to be the infected one, day by day, and the result is illustrated in Table 4.

Table 4

| Kinds of Tobacco seedling | Test Composition | No. | 7 days after inoculation | 9 days after inoculation | 12 days after inoculation | 15 days after inoculation | 20 days after inoculation |
|---|---|---|---|---|---|---|---|
| Bright Yellow | Present Composition | 1 | 0/15 | 1/15 | 2/15 | 2/15 | 3/15 |
| | | 3 | 2/15 | 3/15 | 3/15 | 7/15 | 7/15 |
| | | 8 | 0/15 | 1/15 | 3/15 | 3/15 | 4/15 |
| | | 13 | 1/15 | 2/15 | 3/15 | 5/15 | 5/15 |
| | Reference Composition | 1 | 5/15 | 5/15 | 9/15 | 10/15 | 11/15 |
| | Untreated Zone | | 5/10 | 9/10 | 10/10 | 10/10 | 10/10 |
| Xanthi | Present Composition | 1 | 0/15 | 0/15 | 1/15 | 2/15 | 2/15 |
| | | 3 | 1/15 | 1/15 | 2/15 | 4/15 | 4/15 |
| | | 8 | 0/15 | 1/15 | 2/15 | 2/15 | 3/15 |
| | | 13 | 1/15 | 2/1/5 | 2/15 | 3/15 | 4/15 |
| | Reference Composition | 1 | 4/15 | 5/15 | 9/15 | 9/15 | 10/15 |
| | Untreated Zone | | 3/10 | 7/10 | 9/10 | 10/10 | 10/10 |

TEST 4

The solubility in water of the present composition is tested. Namely, 2 g of the test composition is dissolved in 200 ml or 400 ml of town water and the time till it is completely dissolved to be tranparent is measured and the results were illustrated in Table 5.

Table 5

| Test composition | No. | Time until it dissolves completely (min.) | |
|---|---|---|---|
| | | Concentration | |
| | | 100 times dilution | 200 times dilution |
| Present Composition | 1 | 1 | 0.25 |
| | 2 | 2.5 | 2 |
| | 3 | 4 | 3.5 |
| | 4 | 1.5 | 1 |
| | 5 | 5 | 4 |
| | 6 | 5 | 4 |
| | 7 | 5 | 4 |
| | 8 | 3.5 | 3 |
| | 9 | 3 | 2.5 |
| | 10 | 4 | 3.5 |
| | 11 | 2.5 | 2.5 |
| | 12 | 3 | 2.5 |
| | 13 | 1.5 | 1 |
| | 14 | 2.5 | 2.0 |
| | 15 | 3.0 | 2.5 |
| Reference Composition | 1 | 13 | 11 |
| | 2 | 13 | 12 |
| | 3 | more than 180 | more than 150 |

TEST 5

The dissolved situations when the hardess of diluted water is changed are examined. 2 g of the test composition respectively is diluted in 200 ml of town water, hard water of 10th hardness and hard water of 20th hardness respectively in 300 ml beaker and stirred for 5 minutes, the dissolved situation is examined and the result is illustrated in the Table 6.

Table 6

| | | dissolved situation | | |
|---|---|---|---|---|
| | | town water | hard water 10th grade | hard water 20th grade |
| Present Composition | 1 | A | A | A' |
| | 2 | A | A | A' |
| | 3 | A | A | A' |
| | 4 | A | A | A' |
| | 5 | A | A | A' |
| | 6 | A | A | A' |
| | 7 | A | A | A' |
| | 8 | A | A | A' |
| | 9 | A | A | A' |
| | 10 | A | A | A' |
| | 11 | A | A | A' |
| | 12 | A | A | A' |
| | 13 | A | A | A' |
| | 14 | A | A | A' |
| | 15 | A | A | A' |
| Reference Composition | 1 | B | B | B' |
| | 2 | B | C | C' |
| | 3 | C | C | C' |

A completely dissolves
A' completely dissolves but viscosity increases a little
B some insoluble material remains
B' some insoluble material remains and viscosity increases a little
C most parts are insoluble
C' most parts are insoluble and which become gelatinous

TEST 6

As to the present composition 1 and the reference composition 1 shown in Table 1, after the respective component is mixed and pulverized, the compositions are sieved by a standard sieve to various particle sizes. The effect against TMV, the injury and dissolved time are examined according to the same method shown in Test 1. The concentration of the solution employed for TMV is 100-times dilution.

Table 7

| Test composition | | Particle Size of Composition (mesh) | Protection Value for TMV-disease spot (%) | Injury on Tobacco Plant (Bright Yellow) | Time till it completely dissolves (min) 100 times dilution |
|---|---|---|---|---|---|
| Present Composition | 1 | less than 40 | 95 | none | 5 |
| | | 40–100 | 97 | " | 2 |
| | | 100–200 | 100 | " | 1 |
| | | 200–250 | 98 | " | 1 |
| | | more than 250 | 97 | " | 3 |
| Reference Composition | 2 | less than 40 | 81 | none | more than 60 |
| | | 40–100 | 85 | " | 30 |
| | | 100–200 | 88 | " | 15 |
| | | 200–250 | 87 | " | 15 |
| | | more than 250 | 82 | " | more than 60 |

What is claimed is:

1. An agricultural pesticide composition which comprises:
   at least one biopolymer having prevention effects on plant diseases selected from the group consisting of alginic acid, carrageenan, casein, $\beta$-globulin, $\alpha$-globulin, lact-globulin, albumin, gluten, pectin, starch, gelatin and water-soluble salts thereof;
   at least one carbonate selected from the group consisting of calcium carbonate, sodium carbonate, sodium bicarbonate, potassium carbonate, potassium bicarbonate and ammonium carbonate;
   at least one organic acid selected from the group consisting of tartaric acid, citric acid, succinic acid, fumaric acid, lactic acid, malic acid, maleic acid, phthalic acid, acetic acid and lauric acid; and
   1-10 percent, based on the weight of the bipolymer, of silica or a silica-containing material;
   the carbonate and organic acid being present in a combined amount of 10 to 50 percent by weight based on the biopolymer.

2. A composition of claim 1, which contains as bipolymer having prevention effect of plant-diseases, at least one selected from the group consisting of alginic acid, casein, $\alpha$-globulin and water-soluble salt thereof.

3. A composition of claim 1, which contains as silica or silica-containing material, at least one selected from the group consisting of silica, talc, clay, kaoline, bentonite, diatomaceous earth and white carbon.

4. A composition of claim 1, which contains as organic acid, at least one selected from the group consisting of succinic acid, tartaric acid, citric acid, fumaric acid and malic acid.

5. A composition of claim 1, which contains as carbonate, at least one selected from the group consisting of sodium bicarbonate, sodium carbonate, potassium bicarbonate and potassium carbonate.

6. A composition of claim 1 in which a particle size of composition is in the range of 100–200 mesh.

7. The composition of claim 1 which further comprises 0.5 to 8 percent by weight, based on the biopolymer, of a surface active agent.

8. The compositon of claim 1, which comprises sodium alginate, diatomaceous earth, sodium caseinate, sodium bicarbonate, tartaric acid, citric acid and a surface active agent.

9. The composition of claim 1, which comprises sodium alginate, sodium caseinate, white carbon, sodium bicarbonate, tartaric acid, and a surface active agent.

10. The composition of claim 1, which comprises sodium alginate, sodium caseinate, talc, sodium bicarbonate, tartaric acid and a surface active agent.

11. The composition of claim 1, which comprises sodium alginate, sodium caseinate, clay, sodium bicarbonate, tartaric acid and a surface active agent.

12. The composition of claim 1, which comprises sodium alginate, sodium caseinate, diatomaceous earth, sodium carbonate, succinic acid and a surface active agent.

13. A method for combatting plant diseases which comprises applying to the plant the composition of claim 1.

* * * * *